No. 825,423. PATENTED JULY 10, 1906.
G. E. SCHMITT.
GLASS BLOWING MACHINE.
APPLICATION FILED AUG. 12, 1905.

3 SHEETS—SHEET 2.

Witnesses:
R. W. Runser.
J. F. Webster.

Inventor.
Georg E. Schmitt
by Wilhelm, Parker & Hard,
Attorneys.

No. 825,423. PATENTED JULY 10, 1906.
G. E. SCHMITT.
GLASS BLOWING MACHINE.
APPLICATION FILED AUG. 12, 1905.
3 SHEETS—SHEET 3.
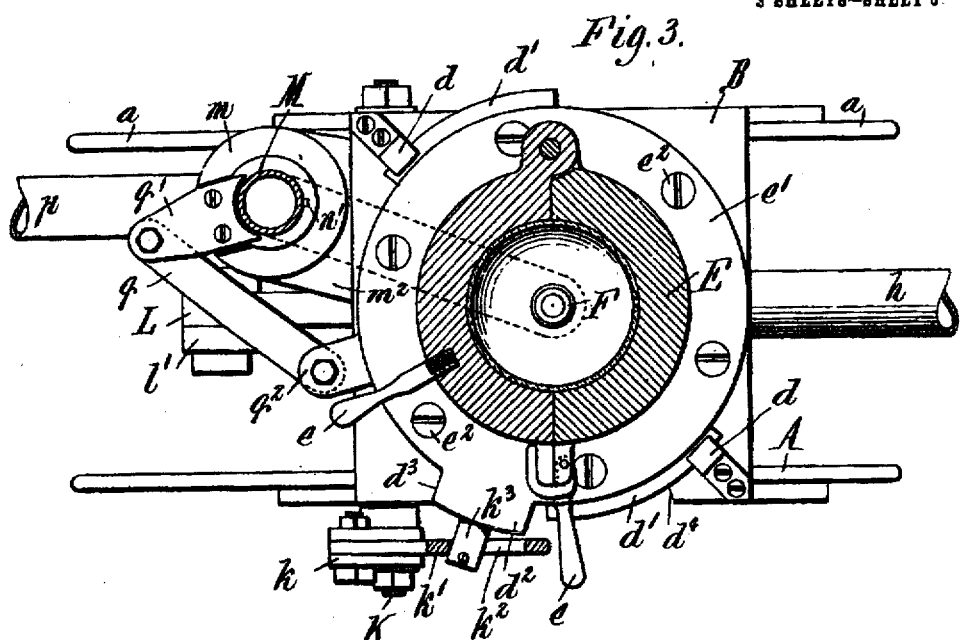
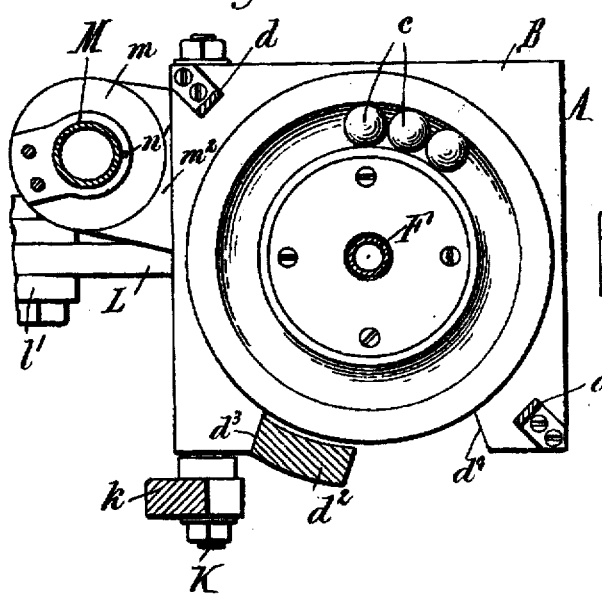
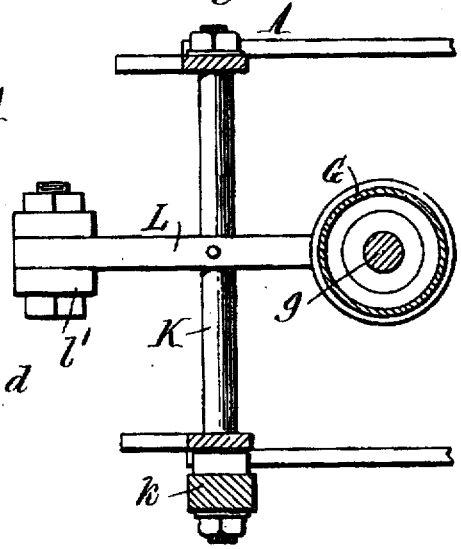
Witnesses:
R. W. Rumor
J. F. Webster
Inventor.
Georg E. Schmitt
by Wilhelm, Parker, Hard
Attorneys.

UNITED STATES PATENT OFFICE.

GEORG EUGENE SCHMITT, OF WELLSBURG, WEST VIRGINIA.

GLASS-BLOWING MACHINE.

No. 825,423.  Specification of Letters Patent.  Patented July 10, 1906.

Application filed August 12, 1905. Serial No. 273,972.

*To all whom it may concern:*

Be it known that I, GEORG EUGENE SCHMITT, a citizen of the United States, residing at Wellsburg, in the county of Brooke and State of West Virginia, have invented a new and useful Improvement in Glass-Blowing Machines, of which the following is a specification.

This invention relates to machines for blowing hollow glass articles, and in certain features thereof relates more particularly to machines for blowing glass articles having oppositely-disposed hollow portions connected by a solid portion—such, for instance, as glass lamp-bodies which have a hollow base and oil-font connected by a solid column or waist.

The principal objects of the invention are to produce a glass-blowing machine of simple and economical construction which is capable of a rapid, easy, and efficient operation; to so construct, arrange, and operate the blow-rod that it will readily enter and withdraw from the neck or collar of the article without breaking or distorting the same; to provide the machine with a blast-pipe for directing a cooling-blast against the intermediate connecting portion of the article to prevent the perforation of the same in blowing the article, which blast-pipe is movable away from the mold to prevent cooling the same when empty; to provide a movable table or support for the blow-mold and connections, whereby the blow-rod and also the air-blast pipe are operated by the movement of said mold-table, and to improve glass-blowing machines in the respects hereinafter specified, and set forth in the claims.

The machine hereinafter described in detail comprises, briefly stated, a horizontal oscillatory mold table or support, on which the blow-mold is secured, a blow-rod movable vertically into and out of the bottom of the blow-mold through a hole in said mold-table, and connections between said mold-table and blow-rod whereby the oscillation of the mold and table to which it is secured raises and lowers said blow-rod into and out of blowing position.

The machine is also provided with an air-blast pipe for directing a cooling-blast down against the article in the blow-mold, which blast-pipe is movable toward and from the blow-mold with the blow-rod and is connected to and operated by the oscillatory mold-table.

Figure 1:
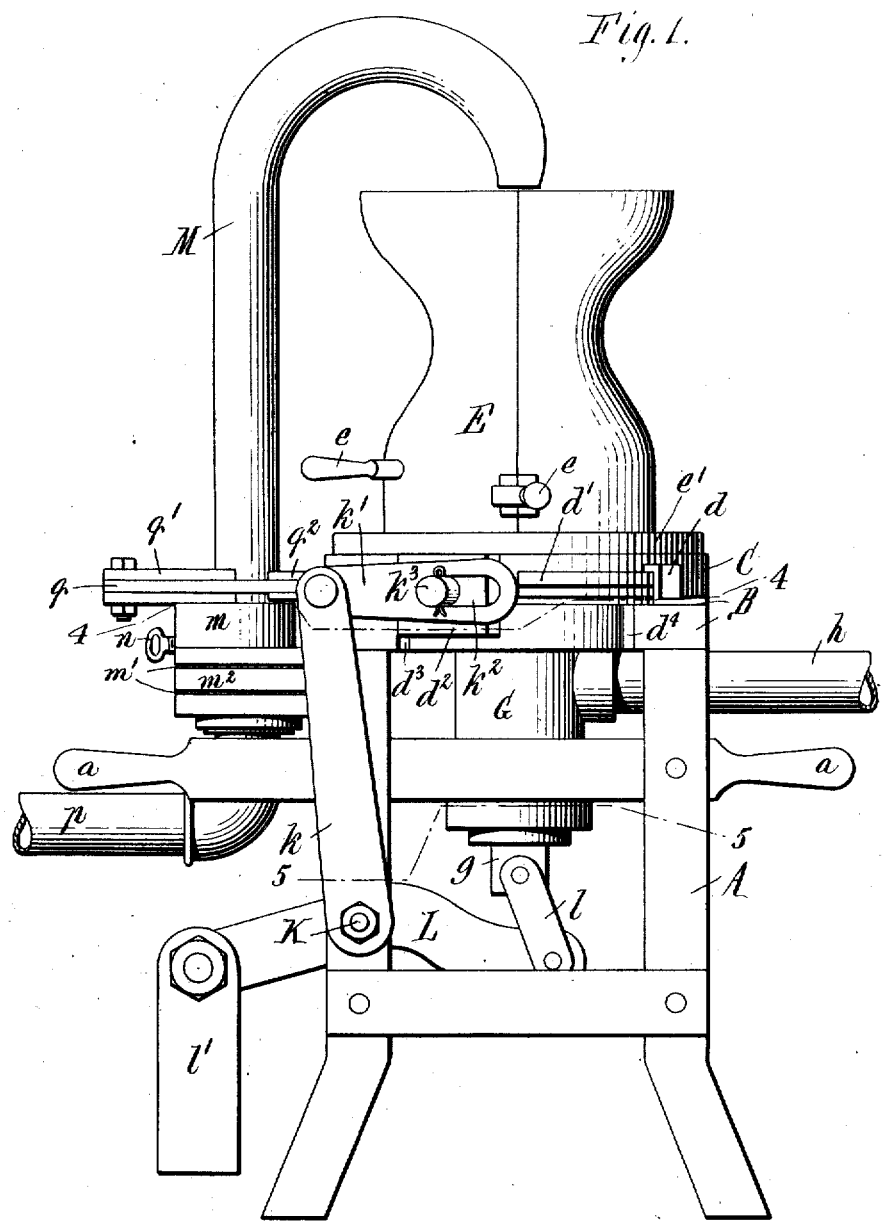
Figure 2:
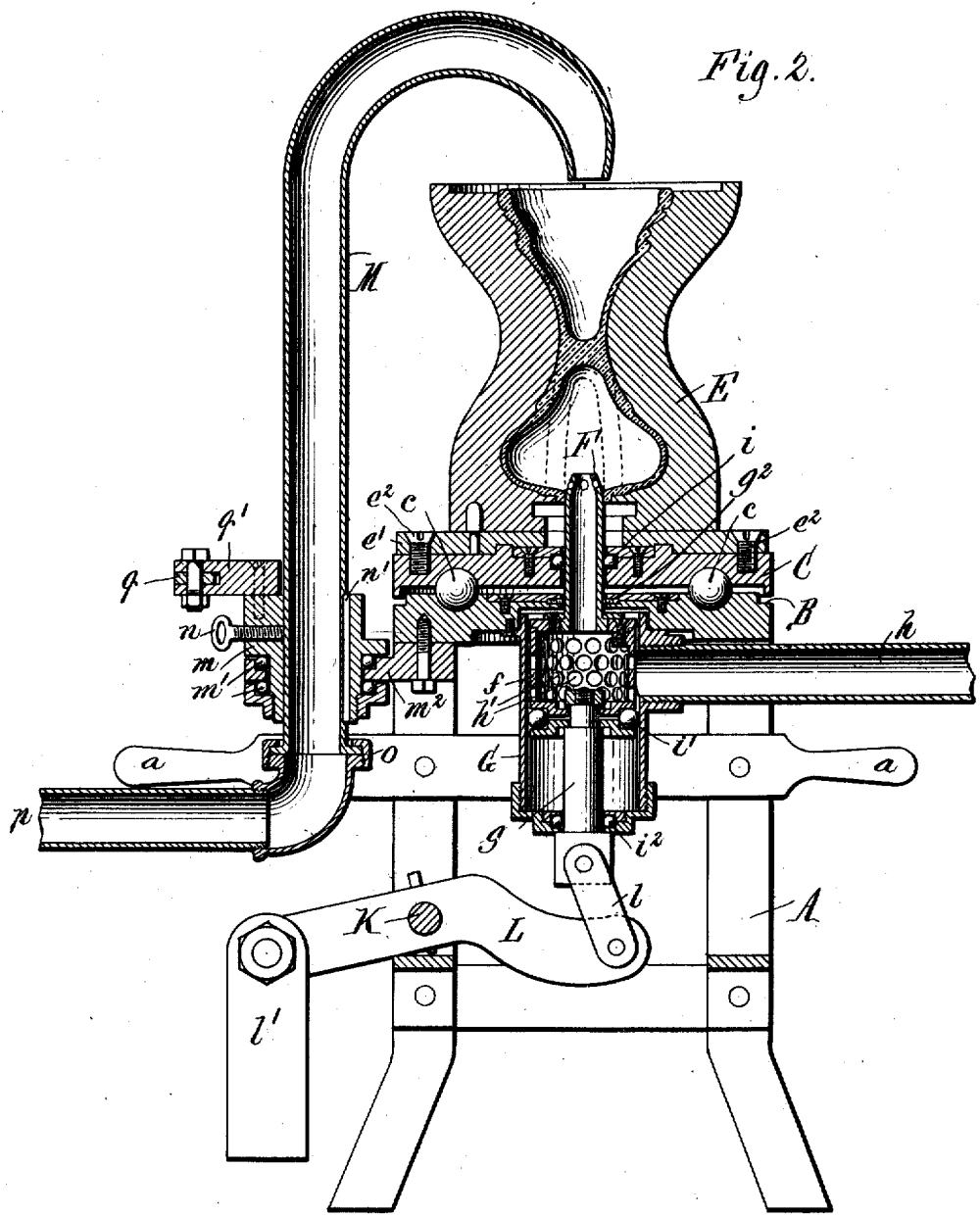

In the accompanying drawings, consisting of three sheets, Figure 1 is a side elevation of a glass-blowing machine embodying the invention. Fig. 2 is a sectional elevation thereof. Fig. 3 is a plan view, partly in horizontal section, thereof. Fig. 4 is a fragmentary sectional plan thereof in line 4 4, Fig. 1. Fig. 5 is a sectional plan of the blow-rod-operating mechanism in line 5 5, Fig. 1.

Like letters of reference refer to like parts in the several figures.

A represents a supporting stand or frame for the several parts of the machine. The frame may be of any suitable construction, that shown in the drawings being of a portable nature and provided with handles *a* for carrying it from place to place and having a flat or horizontal top B.

C represents a horizontal mold table or support which in the construction shown is rotatably mounted so as to oscillate in a horizontal plane upon a bearing consisting of balls *c*, confined in circular ball-races in the top of the frame and bottom of the mold-table. The mold-table is held in place by retaining-plates *d*, Figs. 1 and 3, secured to the frame-top and overhanging laterally-projecting flanges *d'* on the mold-table, and its oscillating movement in opposite directions is limited by a lug $d^2$, projecting from the mold-table and having a portion depending between and adapted to strike against either of two stop-faces $d^3$ $d^4$ on the frame. The mold-table could be rotatably supported and its movements limited in any other suitable way.

The blow-mold E, or mold in which the blank is blown into form, is of known or usual construction, consisting of movably-connected sections provided with operating-handles *e*, by which the mold is opened to receive the blank, closed to surround the blank, and opened to permit the removal of the finished article. The form of the mold depends upon the shape of the article to be produced and differs with different articles. The mold shown in the drawings is for making the glass lamp-body shown therein in Fig. 2 and has a cavity enlarged at its upper and lower portions and contracted at its middle portion to form the base, oil-font, and waist portions, respectively, of the lamp-body. The mold has a base *e'*, which is secured to the mold-table, so as to turn therewith, by any suitable means—for instance, by screws $e^2$.

F represents the blow rod or tube, through which the air is forced into the hollow blank to blow the same to the form of the cavity of the blow-mold. The blow-rod is upright and is movable vertically through central alined holes in the top of the frame, the mold-table, and base of the blow-mold to insert it into and withdraw it from the blow-mold. Its upper end is preferably tapered and provided with central and lateral air-discharge orifices, as shown, and its lower open end is connected to a hollow piston $f$, which is confined loosely in an air-cylinder G and is provided with a piston-rod $g$, projecting out of the lower end of the cylinder for moving the piston vertically in the cylinder. In the construction shown the upper end of the cylinder is formed by the top of the frame, and air is prevented from escaping from the cylinder around the blow-rod by a stuffing-box $g^2$, surrounding the blow-rod. Air under pressure is admitted to the cylinder G through an air-supply pipe $h$, connected with the cylinder, and the side walls of the hollow piston are provided with perforations $h'$, through which air can enter the piston and blow-rod when the piston is raised, as shown in Fig. 2. The piston and blow-rod are preferably guided by ball-bearings $i$, $i'$, and $i^2$, of any suitable construction, arranged, respectively, between the blow-rod and the mold-table, the piston and the cylinder, and the piston-rod and the lower end of the cylinder. The piston has a loose or swivel connection of any suitable kind with its piston-rod, so that it is free to turn in the cylinder on the rod, which is held from turning. The piston and blow-rod are guided independently of the piston-rod by their ball-bearings $i'$ and $i$ and move very freely. The upper ball-bearing $i$ prevents the blow-rod from turning with the mold-table when the latter is oscillated; but the blow-rod and piston are free to turn with the mold and mold-table in case the neck of the article should shrink around the blow-rod sufficiently to cause it to stick in the glass article, and thus prevent the breakage or distortion of the neck of the article. The walls of the piston being perforated on all sides permit the entrance of air into the piston regardless of the turning thereof in the cylinder. The piston being loose in the cylinder, the air in the upper end of the latter can escape around the piston to the lower end of the cylinder when the piston rises, and therefore will not interfere with the upward movement of the piston. The upper end of the blow-rod being tapered, it will readily free itself from the neck of the article when lowered out of the mold, and it will also more readily enter necks which may differ slightly in diameter by reason of their shrinking to a greater or less extent in different articles.

The blow-rod and piston are raised and lowered by oscillating the mold-table through connecting mechanism, which in the machine illustrated is constructed as follows: K represents a horizontal rock-shaft journaled in suitable bearings in the lower portion of the frame and having fixed to one end an upwardly-extending rock-arm $k$. A link $k'$, Figs. 1 and 3, is pivoted at one end to the upper end of the rock-arm $k$ and is provided at its other end with a slot $k^2$, in which slidably engages a stud or pin $k^3$, projecting laterally from the oscillating mold-table. Fixed centrally to the rock-shaft K in any suitable manner is a lever L, which is connected at its inner end by a link $l$ to the piston-rod for the blow-rod piston and is preferably provided at its outer end with a counterbalancing-weight $l'$ for the piston and blow-rod. By this mechanism the blow-rod is raised into the blow-mold when the mold-table is oscillated in one direction and is lowered when the mold-table is oscillated in the opposite direction. The slot in the link $k'$, connecting with the mold-table, permits the latter to be turned part way in either direction before the blow-rod is moved, so that the blow-rod is inserted into or withdrawn from the mold just before the latter comes to rest after movement with the mold-table.

The operation of the machine as thus far described is as follows: Before the commencement of the operation the mold will be open and the mold-table in its right-hand position—that is, with its stop-lug $d^2$ against the stop-face $d^4$ on the frame. The blank, which has been previously formed in the mold or in any known manner, is placed in the blow-mold with the mouth of the cavity located in the neck of the blow-mold, and the latter is closed. The mold and mold-table are then turned to the left, by means of the handles of the blow-mold, until arrested by the engagement of the stop-lug $d^2$ with the stop-face $d^3$. This movement of the mold-table, through the described mechanism, raises the piston $f$ and blow-rod F to the position shown in Fig. 2, in which the tapered upper end of the blow-rod enters the neck of the blow-mold. With the piston and blow-rod in this position air passes from the supply-pipe $h$ through the perforated piston and blow-rod into the blank, expanding the latter into form in the blow-mold. When the article is blown, the mold and mold-table are oscillated to the initial position, which through the mechanism connecting the mold-table and piston $f$ lowers the blow-rod out of the mold and shuts off the air. The mold is then opened and the article removed.

The machine is also preferably provided with a pipe M for directing a cooling-blast into the upper hollow portion of the article while the lower hollow portion is being blown when the machine is used for blowing lamp-bodies or other articles having oppositely-disposed hollow portions. In the construction shown the blast-pipe, which is arranged vertically at one side of the machine and has a gooseneck or downturned upper discharge end, passes through and is supported by a collar $m$, rotatably supported, preferably by suitable ball-bearings $m'$, in a bracket $m^2$, secured to and projecting from the frame A. The blast-pipe is secured in the collar $m$, as by a set-screw $n$, which allows of the vertical adjustment of the pipe to suit molds of different heights, and is held from turning in the collar or independently thereof, as by a pin or key $n'$ slidably engaging in a longitudinal groove in the collar. The lower end of the blast-pipe M is connected, preferably by a swivel-joint $o$, with a pipe $p$ for air under pressure. The supporting-collar for the blast-pipe is connected to the mold-table, for instance, by a link $q$, pivoted to projecting arms $q'$ $q^2$ on the collar and mold-table, so that the upper end of the blast-pipe is swung around over the center of the blow-mold when the mold-table is moved to raise the blow-rod and is swung back away from the mold when the mold-table is moved in the opposite direction to lower the blow-rod. When the article is in the mold and being blown, the blast-pipe directs its blast into the upper cavity of the article against the intermediate connecting portion, keeping the same cool and preventing the air-pressure from the blow-rod from blowing a hole through the said connecting portion. When, however, the mold-table is oscillated to lower the blow-rod, the upper end of the blast-pipe is swung away from the mold, so as not to cool the mold when the article is removed therefrom. The blast-pipe could be constructed, supported, and operated from the mold-table in other ways without departing from the invention.

The other described features of the machine are not necessarily limited to a machine having the cooling-blast pipe, and the cooling-blast pipe could be employed in a machine in which the other parts are of different construction and operation.

I claim as my invention—

1. The combination of a blow-rod which is movable vertically into and out of blowing position, a mold-table which is movable about the blow-rod, and connections between the mold-table and blow-rod whereby the latter is raised and lowered by moving the mold-table, substantially as set forth.

2. The combination of an oscillatory mold-table, a blow-rod which is movable vertically into and out of blowing position, and connections between the mold-table and blow-rod whereby the latter is raised and lowered by moving the mold-table, substantially as set forth.

3. The combination of a movable mold-table, a blow-rod which is arranged below the mold-table and is movable into and out of blowing position, and connections between the mold-table and blow-rod whereby the latter is raised and lowered by moving the mold-table, substantially as set forth.

4. The combination of an oscillatory mold-table, a blow-rod which is arranged centrally below the mold-table and is movable vertically into and out of blowing position, and connections between the mold-table and blow-rod whereby the latter is raised and lowered by moving the mold-table, substantially as set forth.

5. The combination with a blow-rod which is movable vertically into and out of blowing position, a mold-table which is concentric with the blow-rod and is movable about the blow-rod and independently thereof, and connections between the mold-table and blow-rod whereby the latter is raised and lowered by the movement of the former, substantially as set forth.

6. The combination of a blow-rod which is movable vertically into and out of blowing position, a mold-table which is concentric with the blow-rod and is movable about the blow-rod and independently thereof, said blow-rod being also rotatable about its axis, and connections between the mold-table and blow-rod whereby the latter is raised and lowered by the movement of the former, substantially as set forth.

7. The combination of a blow-rod which is movable vertically into and out of blowing position, a mold-table which is movable about the blow-rod, means movable with the blow-rod for controlling the air-supply thereof, and connections between the mold-table and blow-rod whereby the latter is raised and lowered by moving the mold-table, substantially as set forth.

8. The combination of a blow-rod which is movable vertically into and out of blowing position, a mold-table which is movable about the blow-rod, an air-cylinder, a piston carrying the blow-rod and movable in said cylinder and having one or more holes for admitting air from said cylinder to the blow-rod, and connections between the mold-table and said piston whereby the latter is raised and lowered by moving the mold-table, substantially as set forth.

9. The combination of a mold, a movable mold-table, a blast-pipe for cooling the article in the mold, and connections between the mold-table and blast-pipe for moving the latter toward and from the mold by the movement of the mold-table, substantially as set forth.

10. The combination of a mold, an oscillatory mold-table, a laterally-swinging blast-pipe for cooling the article in the mold, and connections between the mold-table and blast-pipe for moving the latter toward and from the mold by the movement of the mold-table, substantially as set forth.

11. The combination of a mold, a blow-rod movable into and out of blowing position, a blast-pipe movable toward and from the mold, and a single operating mechanism for said blow-rod and blast-pipe, substantially as set forth.

12. The combination of a mold, a blow-rod movable into and out of blowing position, a blast-pipe movable toward and from the mold, a movable mold-table, and connections between said mold-table and the blow-rod and blast-pipe for operating said blow-rod and blast-pipe from said mold-table, substantially as set forth.

13. The combination of a mold, an oscillatory mold-table, a blast-pipe for cooling the article in the mold, a rotatable support to which said blast-pipe is adjustably secured, and means connecting said mold-table and blast-pipe support whereby the blast-pipe is operated by the movement of the mold-table, substantially as set forth.

Witness my hand this 7th day of August, 1905.

GEORG EUGENE SCHMITT.

Witnesses:
HARRY F. BAUMER,
THOS. H. WEIRICH.